(12) United States Patent
James

(10) Patent No.: US 6,768,285 B2
(45) Date of Patent: Jul. 27, 2004

(54) POWER SYSTEM FOR CONVERTING VARIABLE SOURCE POWER TO CONSTANT LOAD POWER

(76) Inventor: Ellen James, Coherent Power, 768 Brittain La., Santa Rosa, CA (US) 95407

( * ) Notice: Subject to any disclaimer, the term of this patent is extended or adjusted under 35 U.S.C. 154(b) by 0 days.

(21) Appl. No.: 10/201,417

(22) Filed: Jul. 22, 2002

(65) Prior Publication Data

US 2003/0071597 A1 Apr. 17, 2003

Related U.S. Application Data

(60) Continuation-in-part of application No. 09/814,077, filed on Mar. 19, 2001, now Pat. No. 6,600,292, which is a continuation-in-part of application No. 09/499,097, filed on Feb. 4, 2000, now Pat. No. 6,204,630, which is a division of application No. 08/518,638, filed on Aug. 24, 1995, now Pat. No. 6,087,802.

(51) Int. Cl.[7] .............................................. H01M 10/46

(52) U.S. Cl. ..................................................... 320/104
(58) Field of Search .............................. 320/104, 137; 363/28, 89, 124; 323/266

(56) References Cited

U.S. PATENT DOCUMENTS

| | | | |
|---|---|---|---|
| 6,087,802 A | * | 7/2000 | James |
| 6,204,630 B1 | | 3/2001 | James ........................ 320/104 |
| 6,600,292 B2 | * | 7/2003 | James |

* cited by examiner

*Primary Examiner*—Edward H. Tso
(74) *Attorney, Agent, or Firm*—Rutan & Tucker

(57) ABSTRACT

Manipulation and regulation of power provided by a time-varying power source to continuously provide power to a load by insuring that any minimum voltage or current requirements of the load are met even when the power provided by the time-varying power source itself does not satisfy the load's minimum voltage or current requirements. For a load having a minimum voltage requirement, power from a time varying source will be boosted as necessary to insure that the minimum voltage is maintained.

19 Claims, 1 Drawing Sheet

POWER SYSTEM FOR CONVERTING VARIABLE SOURCE POWER TO CONSTANT LOAD POWER

This is a continuation-in-part of U.S. application Ser. No. 09/814077 now U.S. Pat. No. 6,600,292, filed Mar. 19, 2001, (currently allowed), which was a continuation-in-part of U.S. application Ser. No. 09/499097, filed Feb. 4, 2000, (U.S. Pat. No. 6,204,630) which was a divisional of U.S. application Ser. No. 08/518638, filed Aug. 24, 1995, (U.S. Pat. No. 6,087,802) which was a continued prosecution application of an application filed on Aug. 24, 1995.

FIELD OF THE INVENTION

This invention relates generally to power regulation and conversion.

BACKGROUND OF THE INVENTION

Electrical power may be obtained by converting energy from a non-electrical form into electricity. As examples, electricity can be obtained from light through the use of photovoltaic cells, and from wind through the use of wind generators. Power generated through such conversion systems tends to fluctuate when the source of energy provided to the system for conversion fluctuates. Thus, as the amount of light a solar panel or array is exposed to decreases, the amount of electrical power put out by the panel or array decreases. Similarly, wind generators generate less power as the amount of wind decreases. Such systems may be referred to as time-varying power systems as their power varies over time. It should be noted that the current output of such systems could be either DC or AC, and the variances in power could be in voltage and/or current.

Unfortunately, in many systems minimum voltage, current and/or power requirements need to be satisfied for proper operation of the system. Using a battery charging system as an example, if the voltage being applied to a battery being charged drops below a threshold value, charging does not occur.

SUMMARY OF THE INVENTION

The present invention is directed to the manipulation and regulation of power provided by a time-varying power source to continuously provide power to a load by insuring that any minimum voltage or current requirements of the load are met even when the power provided by the time-varying power source itself does not satisfy the load's minimum voltage or current requirements. For a load having a minimum voltage requirement, power from a time varying source will be boosted as necessary to insure that the minimum voltage is maintained.

It is contemplated that the methods and apparatus disclosed herein are particularly suited for use in a system in which a solar array is used to charge a battery array to insure that the voltage provided to the battery array is maintained above a minimum value even when the voltage produced by the solar array falls below the minimum value.

It is also contemplated that the methods and apparatus of U.S. application Ser. No. 09/814077, filed Mar. 19, 2002, U.S. application Ser. No. 09/499097 (currently allowed), filed Feb. 4, 2000, (U.S. Pat. No. 6,204,630), and U.S. application Ser. No. 08/518638, filed Apr. 3, 1998, each of which is herein incorporated by reference in its entirety, are particularly well suited for use, or to be adapted for use, in regulating power obtained from time-varying sources, particularly solar panels and arrays. Such a regulated power system may have a boost pre-regulator receiving power from a time-varying power source such as a solar array providing an input voltage and an input current, and having compensation networks which are dynamically adjusted for power level; and a forward converter receiving control from a current-mode controller which is in turn under the control of the boost pre-regulator, in order to achieve substantially constant duty cycle of the forward converter over the entire range of power levels. Additionally, for AC devices such as Wind Generators and Water Turbines, the pre-regulator would provide power factor correction to maintain a total harmonic distortion of the input current of 2–3% at full power, and less than 5% at all power levels. For simplicity, regulators/controllers having the characteristics described in the cited applications will be referred to as "E J Controllers" as all the applications have Ellen James as a common inventor. Although described in the cited applications as battery chargers, E J Controllers are applicable to loads other than batteries.

In preferred embodiments, a power system will comprise a power source providing power that varies over time; a power controller receiving varying power from the power source; and a load that receives power from the power controller; wherein power is provided constantly to the load for periods during which the power provided by the power source varies. The phrase "wherein power is provided constantly to the load" is intended to indicate that the power controller manipulates the relationship between the voltage and current it provides to the load in order to meet any voltage or current requirements of the load, while staying within the limits imposed by the power provided to it. It should be readily apparent that constant provision of power to a load occurs only during operation of the system and does not occur when the system is switched off. The system will preferably provide constant power to a load, even if the impedance of the load varies, particularly if the load is a battery array and the varying impedance is caused by charging the battery array. In some such embodiments, the power output by the controller is stepped down in accordance with a charging algorithm, and in relation to the current charge of the battery array.

Some preferred systems will embody a method of charging a battery array comprising the following steps: providing a battery array to be charged; providing a solar array to be used to charge the battery array, the solar array providing power comprising a voltage; controlling the power provided to the battery array from the solar array so as to provide at least a minimum voltage to the battery array at times when the voltage provided by the solar array falls below the minimum voltage; and at all other times providing a constant power level to the battery array when the power provided by the solar array varies.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
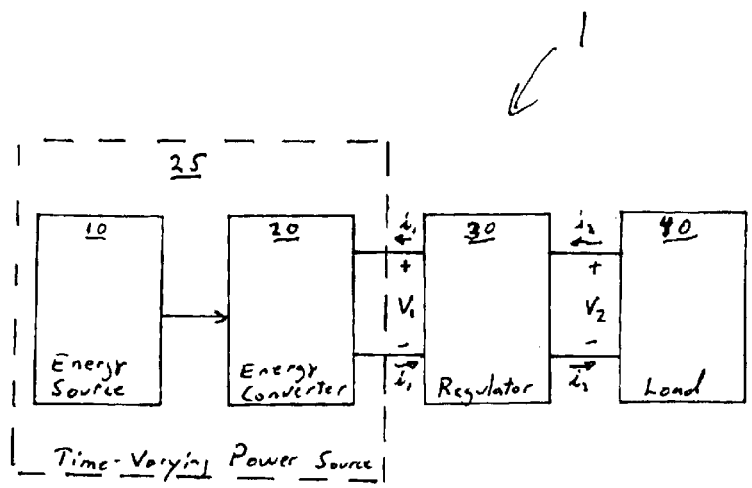
FIG. 1 is a schematic view of a power system embodying the invention.

Referring first to FIG. 1, a power system 1 comprises a time-varying power source 25, a power controller/regulator 30, and a load 40. Time-varying power source 25 comprises an energy source 10, and an energy converter 20. Power source 25 is electrically coupled to regulator 30, and regulator 30 is electrically coupled to load 40. Power source 25 provides power to regulator 30, and regulator 30 manipulates the power provided to it to provide controlled power to load 40. In a preferred embodiment, energy source 10 is the sun, energy converter 20 is a solar array, regulator 30 is an E J controller, and load 40 is a battery array.

Figure 2:
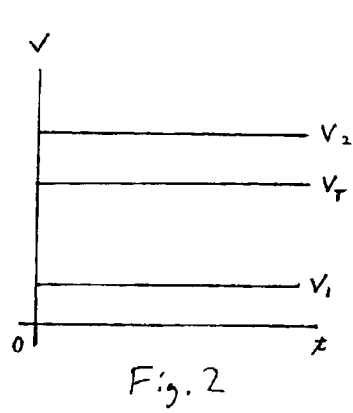
FIG. 2 is a chart illustrating the relationship between V1 and V2 for a first a power system embodying the invention.
Figure 3:
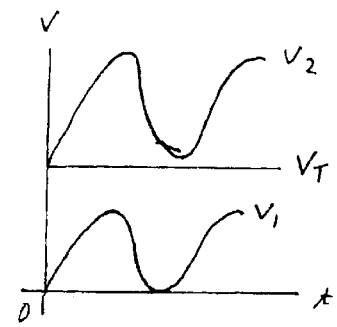
FIG. 3 is a chart illustrating the relationship between V1 and V2 for a first a power system embodying the invention.
Figure 4:
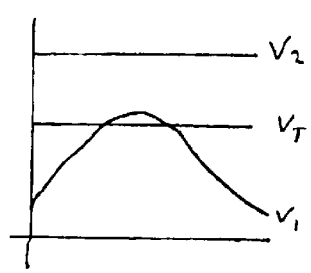
FIG. 4 is a chart illustrating the relationship between V1 and V2 for a first a power system embodying the invention.
Figure 5:
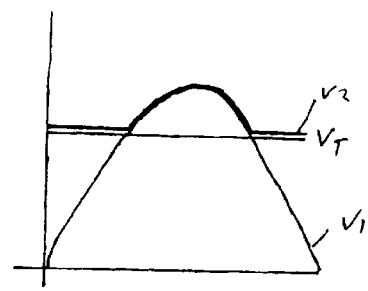
FIG. 5 is a chart illustrating the relationship between V1 and V2 for a first a power system embodying the invention.

FIGS. 2–5 show some of the contemplated relationships between the voltage V1 being provided by power source 25 to regulator 30, and the voltage V2 being provided by regulator 30 to load 40. Although not shown, similar relationships between current I1 provided by source 25 to regulator 30 and current I2 provided by regulator 30 to load 40 are also contemplated. In FIG. 2, a substantially constant voltage V1 is provided to regulator 30. Regulator 30 boosts that voltage above a minimum threshold voltage VT required by load 40 to provide a substantially constant voltage V2 to load 40. V2 is essentially the value of V1 multiplied by a boost factor. In FIG. 3, a similar relationship exists between V1 and V2, but V1 and V2 vary over time. In FIG. 4, voltage V2 is held substantially constant despite changes in voltage V1. In FIG. 5, voltage V2 is maintained at a constant value slightly above VT when V1 is below VT, but is set approximately equal to V2 when V1 is above VT.

In the system of FIG. 1, the regulator 30 is used to constantly supply a minimum voltage or current to the load. As such, if time-varying power supply 25 is a solar array exposed to sunlight and load 40 is a battery array, regulator 30 insures that a minimum threshold voltage is provided to the battery array as long as system 1 is switched on, and power is being provided by the solar array. The minimum voltage is maintained even if lack of sunlight causes V1 to drop below VT. Maintaining V2 above a minimum voltage will generally be accomplished by reducing I2 so that V1*I1 is equal to V2*I2 once the unavoidable losses are accounted for.

It is contemplated that maintaining a minimum voltage can be done in a number of ways. One such is to simply boost V1 to a value above V2, but to do so in relation to the current value of V1 as shown in FIGS. 2 and 3. Alternatively, V2 may be held at a substantially constant value regardless of variation in V1 as shown in FIG. 4. Yet another alternative is to at times hold V2 constant, and at times vary it in relation to variations in V1. Still another alternative is to hold or vary the value of V2 in a manner unrelated to any variations in V1.

Time-varying power source 25 may be any time-varying power source. However, it is contemplated that the apparatus and methods disclosed herein are particularly advantageous when power source 25 is a solar array exposed to sunlight, a wind generator exposed to wind, or a hydro generator exposed to moving water. If power source 25 is a solar array, energy converter 20 will generally comprise one or more photovoltaic cells, and energy source 10 will be either the sun, or another source of light. If power source 25 is a wind generator, energy converter 20 will generally comprise a generator coupled to a rotor, and energy source 10 will be either the wind, or another source of moving air. If power source 25 is a hydro generator, energy converter 20 will generally comprise a generator coupled to a hydro-turbine exposed to moving water.

Regulator 30 may be any controller, regulator, charger or other device that provides the desired characteristics to V2. However, it is preferred that regulator 30 comprise an E J Controller as described in the inventors prior patent applications referenced above.

Load 40 may comprise any load. However, it is contemplated that the apparatus and methods disclosed herein are particularly advantageous when load 40 comprises an electrical energy storage device such as a battery array or capacitor array. It is also contemplated that the apparatus and methods disclosed herein are even more particularly advantageous when load 40 has a minimum voltage or current to be met. If a battery array, load 40 would comprise one or more batteries coupled together. If a capacitor array, load 40 would comprise one or more capacitor arrays. Other electrical energy storage devices are also contemplated. Such devices include, but are not necessarily limited to, mixed battery and capacitor arrays, and devices that convert electrical energy into potential kinetic energy by raising a weight, winding a spring, and/or pumping water.

Thus, specific embodiments and applications of power systems have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A power system comprising:
   a power source providing power that varies over time;
   a power controller receiving varying power from the power source; and
   a load that receives power from the power controller; wherein
   power is provided constantly to the load for periods during which the power provided by the power source varies.

2. The system of claim 1 wherein the load comprises a variable impedance, and the power provided to the load from the controller is substantially constant for periods during which the impedance of the load varies.

3. The system of claim 2 wherein the power source is a solar array positioned to at least occasionally receive light, and the load is an electrical storage device.

4. The system of claim 3 wherein variation in the power provided by the solar array is primarily caused by variation in the amount of light received by the solar array.

5. The system of claim 4 wherein the electrical storage device comprises a battery array.

6. The system of claim 5 wherein the variation in impedance of the battery array is primarily caused by charging of the battery array.

7. The system of claim 6 wherein the power output by the controller is stepped down in accordance with a charging algorithm, and in relation to the current charge of the battery array.

8. The system of claim 7 wherein the power controller comprises:
- a boost pre-regulator, the boost pre-regulator receiving power from the power source and having compensation networks which are dynamically adjusted for power level; and
- a forward converter receiving cycle-by-cycle control from a current-mode controller which is in turn under the control of the boost pre-regulator, in order to achieve substantially constant duty cycle of the forward converter over the entire range of power levels.

9. The system of claim 1 wherein the power provided by the power source comprises a voltage, and the power provided to the load comprises a voltage, and the voltage provided to the load is kept above a minimum value even if the voltage provided by the power source falls below the minimum value provided to the load.

10. The system of claim 9 wherein the power source is a solar array positioned to at least occasionally receive light, and the load is an electrical storage device.

11. The system of claim 10 wherein variation in the power provided by the solar array is primarily caused by variation in the amount of light received by the solar array.

12. The system of claim 11 wherein the electrical storage device comprises a battery array.

13. The system of claim 12 wherein the power controller comprises:
- a boost pre-regulator, the boost pre-regulator receiving power from the power source and having compensation networks which are dynamically adjusted for power level; and
- a forward converter receiving cycle-by-cycle control from a current-mode controller which is in turn under the control of the boost pre-regulator, in order to achieve substantially constant duty cycle of the forward converter over the entire range of power levels.

14. A method of charging a battery array comprising:
providing a battery array to be charged;
providing a solar array to be used to charge the battery array, the solar array providing power comprising a voltage;
controlling the power provided to the battery array from the solar array so as to provide at least a minimum voltage to the battery array at times when the voltage provided by the solar array falls below the minimum voltage; and at all other times providing a constant power level to the battery array at times when the power provided by the solar array varies.

15. The system of claim 1 wherein the power provided by the power source comprises an AC voltage and current of variable frequency, and the power provided to the load comprises a voltage, and the voltage provided to the load is kept above a minimum value even if the voltage provided by the power source falls below the minimum value provided to the load.

16. The system of claim 15 wherein the power source is a wind or hydro generator developing an AC output, and the load is an electrical storage device.

17. The system of claim 16 wherein variation in the power provided by the wind or hydro generator is primarily caused by variation in the amount of wind or water driving the generator.

18. The system of claim 17 wherein the electrical storage device comprises a battery array.

19. The system of claim 18 wherein the power controller comprises:
- a boost pre-regulator, the boost pre-regulator receiving power from the power source and having compensation networks which are dynamically adjusted for power level, the pre-regulator providing power factor correction to maintain a power factor of at least 99.9% and a total harmonic distortion of the input current of 2–3% at full power, and less than 5% at all power levels; and
- a forward converter receiving cycle-by-cycle control from a current-mode controller which is in turn under the control of the boost pre-regulator, in order to achieve substantially constant duty cycle of the forward converter over the entire range of power levels.

* * * * *